United States Patent [19]

Takesue et al.

[11] Patent Number: 4,904,040

[45] Date of Patent: Feb. 27, 1990

[54] OPTICAL WAVEGUIDE COUPLER FOR MONITORING

[75] Inventors: Toshiharu Takesue; Hiroyoshi Yamamoto, both of Tokyo, Japan

[73] Assignee: Seiko Instruments Inc., Tokyo, Japan

[21] Appl. No.: 204,106

[22] Filed: Jun. 8, 1988

[30] Foreign Application Priority Data

Jun. 10, 1987 [JP] Japan .............................. 62-144909

[51] Int. Cl.⁴ .............................................. G02B 6/26

[52] U.S. Cl. .............................. 350/96.15; 350/96.16

[58] Field of Search ............... 350/96.13, 96.15, 96.16, 350/320

[56] References Cited

U.S. PATENT DOCUMENTS 4,490,163 12/1984 Jochem et al. ............... 350/96.15 X
4,515,431 5/1985 Shaw et al. ....................... 350/96.15
4,546,476 10/1985 Shaw et al. .................. 350/96.15 X
4,553,238 11/1985 Shaw et al. .................. 350/96.15 X
4,630,884 12/1986 Jubinski ........................... 350/96.15
4,632,513 12/1986 Stowe et al. ........................ 350/320
4,673,270 6/1987 Gordon ............................ 350/96.15
4,755,037 7/1988 Bjornlie et al. .................. 350/96.15

*Primary Examiner*—John D. Lee
*Assistant Examiner*—John Ngo
*Attorney, Agent, or Firm*—Bruce L. Adams; Van C. Wilks

[57] ABSTRACT

An optical waveguide coupler comprises at least two optical waveguides such as optical fibers closely spaced apart for allowing light propagating in one optical waveguide to couple into the other. Optical waveguide portions of the waveguides are made of materials having different refractive indices respectively. The feature stabilizes the splitting ratio against a slight change in coupling length, whereby the control of the coupling ratio during manufacture becomes easy, and deviations in splitting ratio can be greatly reduced.

8 Claims, 2 Drawing Sheets

OPTICAL WAVEGUIDE COUPLER FOR MONITORING

FIELDS OF THE INVENTION

The present invention relates to optical waveguide couplers, using optical fibers and other waveguides, such as planar waveguides, parallel rib waveguides, embedded channel waveguides, etc. which are used in optical fiber communications and optical measurements.

BACKGROUND OF THE INVENTION

Various processes for the fabrication of waveguide couplers are known. For example, U.S. Pat. No. 3,579,316, and International Publication No. WO87/00934 published under the Patent Cooperation Treaty disclose such fabrication processes. Other waveguide coupler fabrication techniques are disclosed in, e.g., N. TAKATO al: "LOW-LOSS HIGH-SILICA SINGLE-MODE CHANNEL WAVEGUIDES", Electronics Letters Vol.22 No.6 pp.321–322, BUCHMANN et al: "REACTIVE ION ETCHED GaAs OPTICAL WAVEGUIDE MODULATORS WITH LOW LOSS AND HIGH SPEED", ibid., Vol.20 No.7 pp.295–297. A conventional optical waveguide coupler such as disclosed in the above prior references uses the same material for waveguide portions. However, the drawback of the conventional optical waveguide coupler is that the splitting ratio is greatly dependent upon the coupler length. It is known that the splitting ratio is essentially defined by a function of the coupling coefficient, the propagation constant of waveguide portions and the coupling length. As shown in FIG. 1, light entering into an incident port 1 of an optical fiber couples into a closely placed core in another optical fiber. The splitting ratio R is given by a logarithm of the ratio of light intensities in cores a and b, Pb/Pa, as follows:

$$R = 10\log\frac{P_b}{Pa} = 10\log\frac{X^2\sin^2\beta_c Z}{\Delta^2\,(X\cos\beta_c Z)^2}$$

where X is the coupling coefficient, Δ is a half of the propagation constant difference, Z is a coupling length from the start of coupling and $\beta c=\sqrt{X^2+\Delta^2}$. Conventionally, closely placed waveguides are made of the same material and, therefore the propagation constant difference $\Delta=0$ and $\beta c=X$. Thus the splitting ratio is given as $R=10\log \mathrm{Tan}^2 XZ$. Therefore as shown in FIG. 2, the splitting ratio is governed by a periodic function of the coupling length Z in which complete power transfer from the core a to core b takes place at distances of integer multiples of $\pi/2X$.

Recently, there are growing demands in measurements and optical communications to monitor signal conditions in main communication lines without disturbing the information in the main lines. The use of optical waveguide couplers is easy and inexpensive to accomplish this objective. For such monitoring purpose, the required splitting ratio R is selected to be 20 to 40 dB. If the same material is used, a slight difference in coupling length causes a large change in the splitting ratio R as seen in FIG. 2. Therefore, the control of coupling length to obtain a desired splitting ratio during manufacture is very difficult, which consequently results in many splitting ratio deviations. In addition, there is another problem in which a slight change in external condition such as temperature causes a slight change in coupling length thereby resulting in a large change in the splitting ratio.

SUMMARY OF THE INVENTION

An object of the invention is therefore to solve the abovementioned problems by providing an optical waveguide coupler using at least two optical fibers or a waveguide in which cores of such optical fibers or waveguide portions of waveguides comprise materials of different refractive indices. In an optical waveguide coupler according to the present invention, cores of the optical fibers or waveguide portions of the coupler comprise materials of different refractive indices. This feature lowers the maximum splitting ratio of the closely placed waveguides as shown in FIG. 3 whereby the splitting ratio change around the peaks of the splitting ratio curve due to changes in coupling length can be reduced. Therefore the present invention improves the yield in the fabrication of optical waveguide couplers with a given splitting ratio, and reduces splitting ratio deviations of optical waveguide couplers.

DETAILED DESCRIPTION OF THE INVENTION

Figure 1:
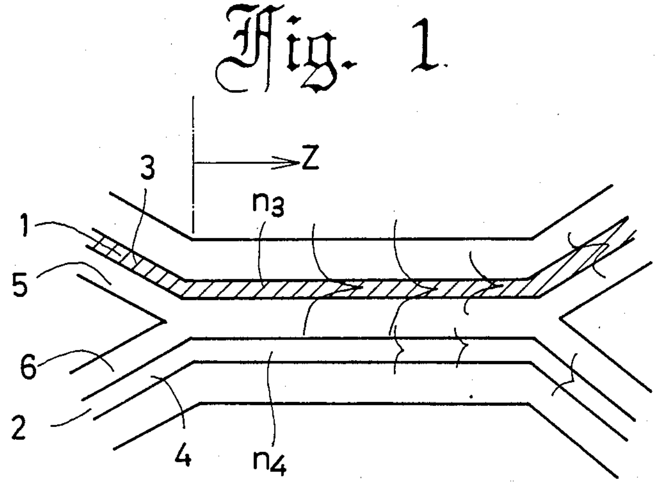
FIG. 1 shows a principle structure of an optical coupler.
Figure 2:
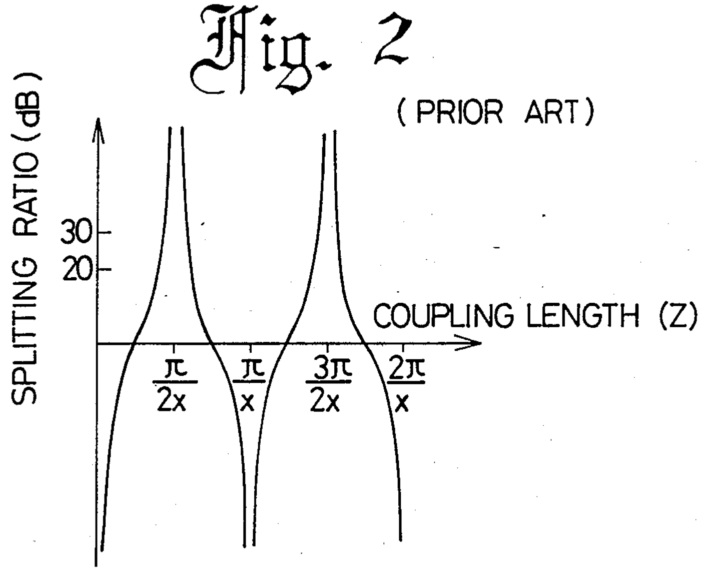
FIG. 2 shows the relationship between coupling length and splitting ratio when the same material is used for cores of closely placed waveguides as in the prior art.

The present invention is hereunder described in detail with reference to preferred embodiments. FIG. 1 is a principle structure of an embodiment of an optical coupler of the present invention using two single-mode optical fibers. FIG. 1 may also represent a typical optical coupler using two multi-mode optical fibers, since the principle structure of a multi-mode fiber is the same as that of a single-mode fiber. The only difference between them is that a multi-mode fiber has a large core diameter with respect to the wavelength of propagating light so that plural modes propagate in the fiber. On the other hand, a single-mode fiber has a very small core diameter (e.g. 10 μm) to propagate only one mode therein.

Further, for the minimum requirement as an optical waveguide such as planar waveguides, parallel rib waveguides, embedded channel waveguides, etc., the waveguide portion should have a refractive index higher than that of the substrate or material surrounding the waveguide portion to propagate light therein. A waveguide coupler, comprises at least two such waveguide portions closely spaced apart to each other so that light propagating in one waveguide portion couples into the other waveguide portion. The basic structure of any waveguide coupler is therefore the same as that of an optical fiber coupler using single-mode optical fibers or multi-mode optical fibers.

Therefore the description here is made with reference only to an optical coupler using single-mode optical fibers.

In a single mode optical fiber coupler, the coupling region is formed by either fusing or etching and splicing with adhesive parts the two single-mode optical fibers. The cores 3 and 4 of these two optical fibers are made of materials having different refractive indices $n_3$ and $n_4$. When light entered into an incident port 1 propagates by a distance Z, the splitting ratio at this point is given by $$R = 10 \log \frac{X^2 \sin^2 \beta Z}{\Delta^2 + (X \cos \beta_c Z)^2}$$

where $\Delta = \pi/\lambda(n_3 - n_4)$, X is the coupling coefficient, $\beta c = \sqrt{X^2 + \Delta_2}$, and $\lambda$ is the wavelength of the light in vacuum.

Figure 3:
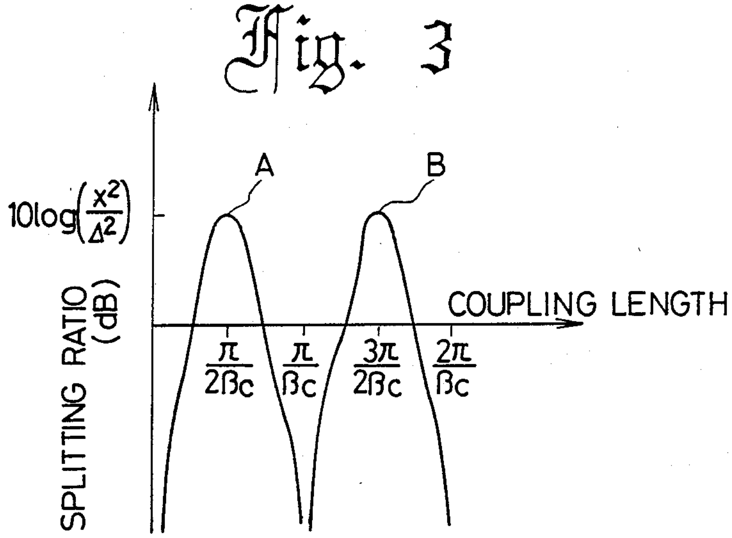
FIG. 3 shows the relationship between coupling length and splitting ratio according to the present invention.

Therefore, when conditions are selected to give the maximum value of the above equation, namely, as being obvious from FIG. 3, when the coupling length is selected to be an odd multiple of $\pi/2\beta c$, the splitting ratio of 10 log $(X^2/\Delta^2)$ is obtained. When refractive indices $n_3$ and $n_4$ of cores or guide portions of closely placed waveguides are selected so that the result becomes the desired splitting ratio, the splitting ratio does not drastically change against a slight change of the coupling length.

For example, when single-mode fibers of 10 $\mu$m in core diameter are used and the coupling length is selected to be between 20 and 30 mm, its coupling coefficient is about $6 \times 10^{-5}$ 1/$\mu$m. Setting the wavelength of the propagating light to be 0.78 $\mu$m and the splitting ratio to be −20 dB, $\pi/\lambda(n_1 - n_2) = 6 \times 10^{-4}$ 1/$\mu$m is obtained. For example, when BACD2 of HOYA (a Japanese glass manufacturer) is used for one of the glass waveguides and BACD7 of HOYA for the other, the refractive index difference $\Delta n$ is $1.8 \times 10^{-4}$. Since this value gives almost the same result of the above equation, the splitting ratio of −20 dB is obtained at odd multiples of $\pi/2\beta c \approx 2.6$ mm.

Figure 4:
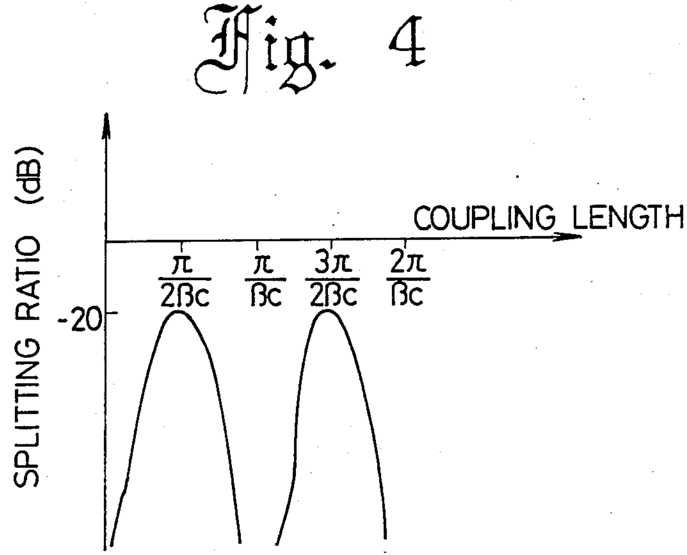
FIG. 4 shows the relationship between coupling length and splitting ratio of one embodiment of the invention.

In this case, the relationship between coupling length and splitting ratio is shown in FIG. 4, and a line branched off from the main transmission line is used for monitoring. In the above embodiment, if the wavelength is selected to be 0.59 $\mu$m and the splitting ratio to be 20 dB, $\pi/\lambda(n_1 - n_2)$ becomes to be $6 \times 10^{-6}$l/$\mu$m. Under this condition, for example, BACD16 of HOYA is used for one of the glass waveguides and BACD165 for the other, the refractive index difference between the two glass materials almost satisfies the above equation. The splitting ratio becomes about 20 dB at point A and point B as given in FIG. 3 at odd multiples of $\pi/2\beta c = 2.6$ mm. In this case, a slight change in the coupling length does not cause a drastic change in the splitting ratio.

In this embodiment,the main transmission line is used for monitoring and the branch line is used for main transmission.

It is obvious that other material combinations can be selected to provide the same characteristics besides the glass materials presented in the above embodiment. Moreover, in the above embodiment, single-mode optical fibers are used as one example, but, as previously described, the same characteristics can be obtained by multi-mode optical fibers and other waveguides. The same result can be obtained with the combination of glass materials having a large difference in refractive index between the two cores by increasing the coupling coefficient thereof, for example by the use of optical fibers having smaller cladding diameter.

According to the present invention, the splitting ratio becomes very stable against a slight change in the coupling length; control of the coupling length during manufacture is therefore easy and it lowers the cost; splitting ratio deviations are thus reduced to the lowest; and the splitting ratio is very stable against external condition changes particularly temperature change. Consequently optical couplers of uniform quality can be produced.

We claim:

1. An optical waveguide coupler comprising:
   at least two light propagating optical portions closely spaced from each other for allowing light propagating in one of said optical portions to couple into one or more others of said optical portions, said optical portions comprising materials having different refractive indices respectively such that the splitting ratio of the coupler is reduced to a selected maximum at predetermined multiples of the coupling length of the coupler.

2. An optical waveguide coupler as defined in claim 1, wherein said optical portions comprise cores of single-mode optical fibers fused together for allowing light propagating in one single-mode optical fiber to couple into one or more other single-mode optical fibers.

3. An optical waveguide coupler as defined in claim 1, wherein said optical portions comprise cores of multi-mode optical fibers fused together for allowing light propagating in one multi-mode optical fiber to couple into one or more other multi-mode optical fibers.

4. An optical waveguide coupler as defined in claim 1, wherein said optical portions comprise waveguides.

5. The optical waveguide coupler of claim 1, in which said light propagating optical portions consist of cores of single-mode optical fibers etched and spliced together.

6. The optical waveguide coupler of claim 1, in which said light propagating optical portions consist of cores of multi-mode optical fibers etched and spliced together.

7. The optical waveguide coupler of claim 1, in which said light propagating optical portions couple at a predetermined coupling power of less than 100%.

8. The optical waveguide coupler of claim 7, in which said light propagating optical portions have a region of coupling along a coupling length of one of odd multiples of $\pi/2B_c$, where $B_c$ is $\sqrt{X^2 + \Delta^2}$, X being the coupling coefficient, $\Delta$ being $\pi/\lambda(n1 - n2)$, $\lambda$ being a wavelength to be monitored, n1 being a first refractive index of one of said optical portions, and n2 being a second refractive index of another of said optical portions.

* * * * *